(12) United States Patent
Lee (10) Patent No.: US 9,972,458 B2
(45) Date of Patent: May 15, 2018

(54) DRAW IN AND OUT TYPE CIRCUIT BREAKER

(71) Applicant: LSIS CO., LTD., Anyang-si, Gyeonggi-do (KR)

(72) Inventor: Sangchul Lee, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days. days.

(21) Appl. No.: 15/335,337

(22) Filed: Oct. 26, 2016

(65) Prior Publication Data

US 2017/0309414 A1 Oct. 26, 2017

(30) Foreign Application Priority Data

Apr. 20, 2016 (KR) .................. 10-2016-0048311

(51) Int. Cl.
*H01H 9/20* (2006.01)
*H01H 9/16* (2006.01)
*H02B 11/10* (2006.01)

(52) U.S. Cl.
CPC .............. *H01H 9/16* (2013.01); *H02B 11/10* (2013.01)

(58) Field of Classification Search
CPC ................................ H01H 9/16; H01H 9/167
USPC .................................................. 200/50.26
See application file for complete search history.

(56) References Cited

U.S. PATENT DOCUMENTS

| 7,847,203 B2 * | 12/2010 | Narayanan | H02B 11/10 |
| | | | 200/400 |
| 2001/0022263 A1 * | 9/2001 | Letient | H02B 11/133 |
| | | | 200/50.26 |
| 2010/0163378 A1 * | 7/2010 | Kim | H02B 11/10 |
| | | | 200/308 |
| 2017/0179692 A1 * | 6/2017 | Farina | H02B 11/10 |

FOREIGN PATENT DOCUMENTS

| EP | 2905853 | 8/2015 |
| JP | H05252621 | 9/1993 |
| JP | 2002017007 | 1/2002 |
| JP | 2004048992 | 2/2004 |
| JP | 3523948 | 4/2004 |
| JP | 2005045970 | 2/2005 |
| JP | 2007244119 | 9/2007 |
| JP | 2011083184 A | 4/2011 |
| JP | 2012151951 | 8/2012 |
| KR | 1020110073041 | 6/2011 |
| KR | 101542767 | 8/2015 |
| WO | PCT/EP2015/051540 | * 1/2015 |

OTHER PUBLICATIONS

Search Report dated Apr. 22, 2016, prepared by the Korean Institute of Patent Information, 3 pages.
(Continued)

*Primary Examiner* — Kyung Lee
(74) *Attorney, Agent, or Firm* — K&L Gates LLP (57) ABSTRACT

Disclosed is a draw in and out type circuit breaker. In the draw in and out type circuit breaker, at least one guide slot is provided in a slide plate, and thus, a clip moves to a test position, a connected position, or a disconnected position with being fitted into the at least one guide slot, thereby enabling a position of the clip to be easily controlled.

6 Claims, 9 Drawing Sheets

(56) References Cited

OTHER PUBLICATIONS

Korean Intellectual Property Office Application No. 10-2016-0048311, Notice of Allowance dated Jun. 30, 2017, 5 pages.
Korean Intellectual Property Office Application No. 10-2016-0048311, Office Action dated Mar. 8, 2017, 5 pages.
European Patent Office Application Serial No. 16196846.6, Search Report dated Aug. 28, 2017, 6 pages.

* cited by examiner

DRAW IN AND OUT TYPE CIRCUIT BREAKER

CROSS-REFERENCE TO RELATED APPLICATION

Pursuant to 35 U.S.C. § 119(a), this application claims the benefit of earlier filing date and right of priority to Korean Patent Application No. 10-2016-0048311, filed on Apr. 20, 2016, the contents of which are all hereby incorporated by reference herein in its entirety.

BACKGROUND OF THE DISCLOSURE

1. Field of the Disclosure

The present disclosure relates to a draw in and out type circuit breaker, and particularly, to a draw in and out type circuit breaker in which a state of a position display device is easily controlled, thereby enabling a position of a circuit breaker to be checked at a distant position without an error.

2. Background of the Disclosure

Generally, circuit breakers are classified into a draw in and out type and a fixing type and a fixed type. In detail, the circuit breakers are classified into fixed type circuit breakers, where a position is fixed in a switchboard panel because only a circuit breaker body is provided, and draw in and out type circuit breakers where only a circuit breaker body is capable of being drawn in and out because an enclosure called a cradle for facilitating maintenance of a circuit breaker is provided. Also, the draw in and out type circuit breakers are largely classified based on three positions which are classified depending on a degree to which a circuit breaker is drawn into a cradle of a circuit breaker body.

That is, the three positions include a disconnected position at which a main circuit and a control circuit of a circuit breaker are all disconnected from the circuit breaker, a test position at which the main circuit is disconnected from the circuit breaker and the control circuit is connected to the circuit breaker, and a connected position at which the main circuit and the control circuit are connected to each other.

Moreover, for safety reasons, the draw in and out type circuit breakers need a position display device that displays which of the three positions a circuit breaker is located at when the circuit breaker is drawn into the cradle.

Moreover, when a worker connects a micro switch of the position display device to a distant position with respect to the cradle, the worker may check a connected position or a disconnected position of a circuit breaker by using an output value of the micro switch at the distant position far away therefrom. In addition to such a configuration, the position display device may be applied to safety circuits, lamps, etc.

Figure 1:
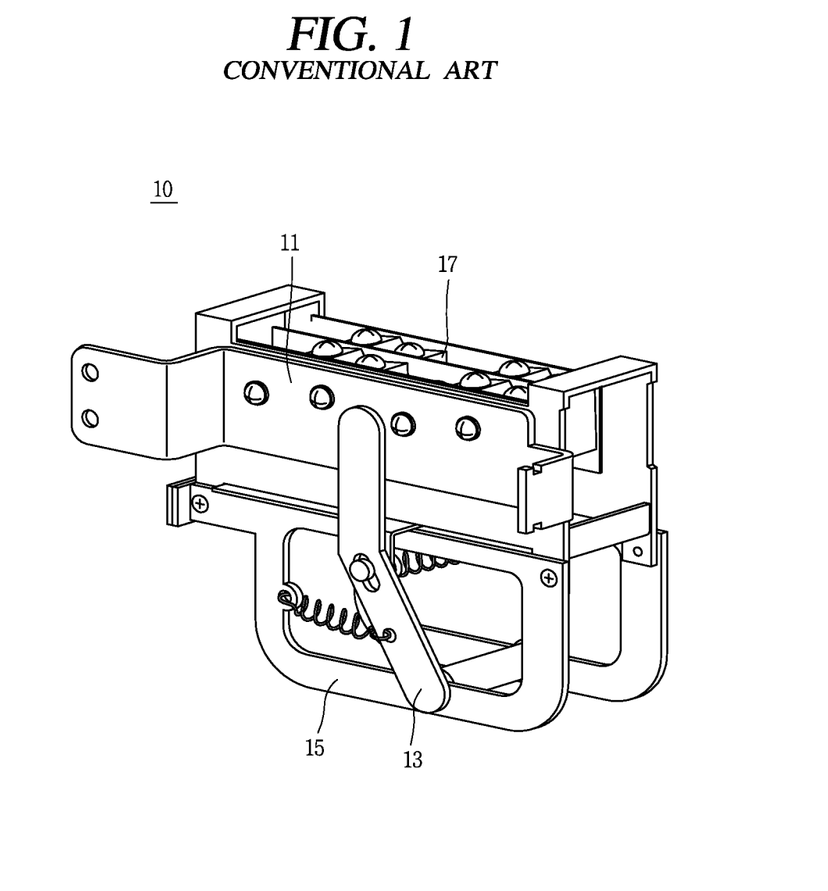
FIG. 1 is a perspective view illustrating a position display device included in the related art cradle.
Figure 2:
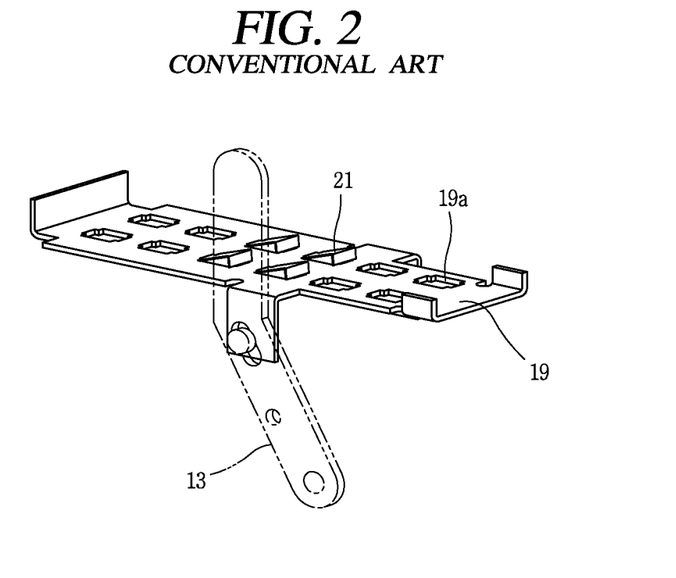
FIG. 2 is a perspective view illustrating a slide plate included in the related art cradle.
Figure 3:
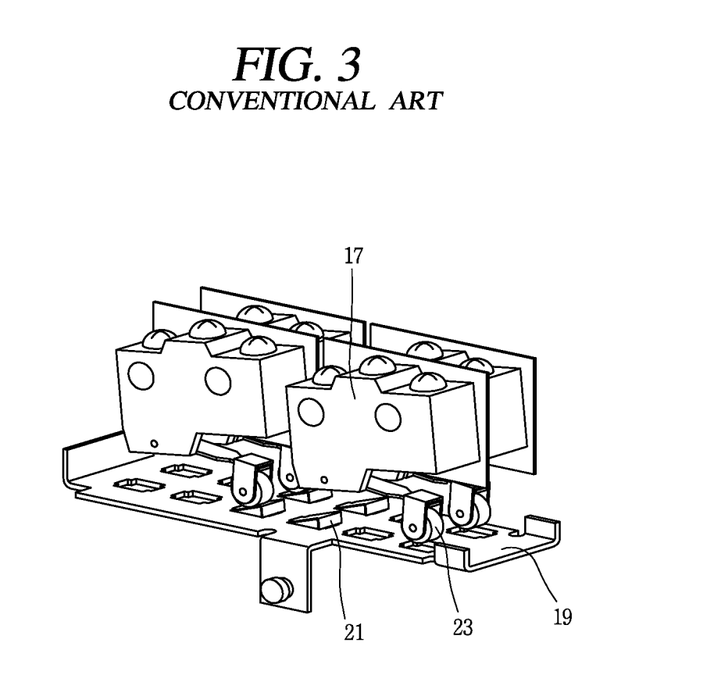
FIG. 3 is a perspective view illustrating an internal configuration of the related art cradle.

FIG. 1 is a perspective view illustrating a position display device included in the related art cradle. FIG. 2 is a perspective view illustrating a slide plate included in the related art cradle. FIG. 3 is a perspective view illustrating an internal configuration of the related art cradle.

As illustrated in FIGS. 1 to 3, a related art position display device 10 of a draw in and out type circuit breaker includes a case 11, a lever 13 which is provided on one side of the case 11 and rotates according to a rotation of a draw gear (not shown), a guide plate 15 which is equipped with the lever 13 and provides a rotation center point of the lever 13, a slide plate 19 which is provided to be movable in a horizontal direction in cooperation with a rotation operation of the lever 13, and a position indication switch 17 which contacts the slide plate 19 and indicates a position of a circuit breaker.

Moreover, the slide plate 19 includes a plurality of openings 19a and a plurality of clips 21 that respectively cover some of the plurality of openings 19a. Also, a plurality of rollers 23 are provided under the switch 17 to be vertically movable.

Therefore, in a process where a circuit breaker body is equipped in a cradle, the draw gear rotates, and the lever 13 rotates in cooperation with the rotation of the draw gear.

When the lever 13 rotates, the slide plate 19 moves in the horizontal direction, and the slide plate 19 relatively moves with respect to the switch 17. Accordingly, some of the openings 19a of the slide plate 17 or the clips 21 respectively covering the openings 19a respectively contact the rollers 23 provided under the switch 17.

In this case, when the rollers 23 are located above the openings 19a, the rollers 23 are inserted into the some openings 19a and move downward. Also, when the rollers 23 are located above the clips 21, the rollers 23 move upward.

Therefore, when the rollers 23 move upward and downward by undergoing the above-described process, each of the rollers 23 pressurizes a specific portion of the switch 139, and thus, the switch 17 operates, thereby externally displaying a position at which is the circuit breaker body is located.

However, in the related art position display device 10 of the draw in and out type circuit breaker which operates as described above, since the clips 21 for determining a test position, a connected position, or a disconnected position are fixed to the slide plate 19, it is difficult to change a position, and the clips 21 are easily separated from the slide plate 19 despite being fixed to the slide plate 19.

Moreover, when the clips 21 are separated for position movement, a risk where a user can lose the clips 21 is large.

SUMMARY OF THE DISCLOSURE

Therefore, an aspect of the detailed description is to provide a draw in and out type circuit breaker in which a state of a position display device is easily controlled, thereby enabling a position of a circuit breaker to be checked at a distant position without an error.

To achieve these and other advantages and in accordance with the purpose of this specification, as embodied and broadly described herein, a draw in and out type circuit breaker including a circuit breaker body, a cradle which moves with the circuit breaker body being accommodated into the cradle, and a position display device connected to the cradle to display a position of the circuit breaker body, the position display device including: a case; a lever provided on one side of the case to rotate according to a rotation of the circuit breaker body; a slide plate provided in the case to move according to a rotation of the lever, the slide plate including at least one guide slot so that a clip is fitted thereinto to move; and a clip fitted into the at least one guide slot to move.

Moreover, a fixing part may be provided under the clip so that the clip is fitted into and fixed to the at least one guide slot.

Moreover, the fixing part may have a hook shape.

Moreover, a fixing groove may be provided in the at least one guide slot, and the fixing part may be fitted into and fixed to the fixing groove according to a movement to a test position, a connected position, or a disconnected position of the circuit breaker body.

Moreover, a fixing groove into which a fixing bar is fitted may be provided in the at least one guide slot according to a movement to a test position, a connected position, or a disconnected position of the circuit breaker body, and a movement guide part which is fitted into the at least one guide slot to guide a movement of the clip may be provided under the clip. Also, a fixing bar may be provided on each of both sides of the movement guide part and may be fitted into the fixing groove according to a movement to the test position, the connected position, or the disconnected position of the circuit breaker body.

Moreover, a fastening hole may be provided in a bottom of the movement guide part. Also, a fastening member may pass through the fastening hole with the clip being fitted into the at least one guide slot, and the clip may be fixed to the slide plate.

Moreover, an accommodating groove may be provided in each of a front end and a rear end of the at least one guide slot, and when the clip moves, one end or the other end of the movement guide part may be accommodated into the accommodating groove.

As described above, in the draw in and out type circuit breaker according to embodiments of the present invention, the one or more guide slots may be provided in the slide plate of the position display device included in the draw in and out type circuit breaker, and the plurality of clips may respectively move to the test positions, the disconnected positions, or the connected positions of the guide slots with being respectively fitted into the guide slots, thereby enabling a position of the clip to be easily controlled.

Moreover, since the clips move with being respectively fitted into the guide slots, it is not required to separate the clips from the guide slots for controlling a position, and thus, a risk of losing the clips in controlling a position is prevented.

Moreover, since the fixing part having a hook shape is provided under the clip, the clip is solidly fixed to the test position, the disconnected position, or the connected position of the guide slot, and thus, is not easily separated from the guide slot.

Moreover, since the fixing bar fitted into the fixing groove of the guide slot is provided under the clip and the movement guide part that guides a movement of the clip is provided, the clip may be fitted into the fixing groove through the fixing bar while moving the guide slot, and thus, a movement of the clip is limited. Accordingly, the clip is fixed to the test position, the disconnected position, or the connected position of the guide slot without being separated from the guide slot.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a draw in and out type circuit breaker according to an embodiment of the present invention will be described in detail with reference to the accompanying drawings.

Figure 4:
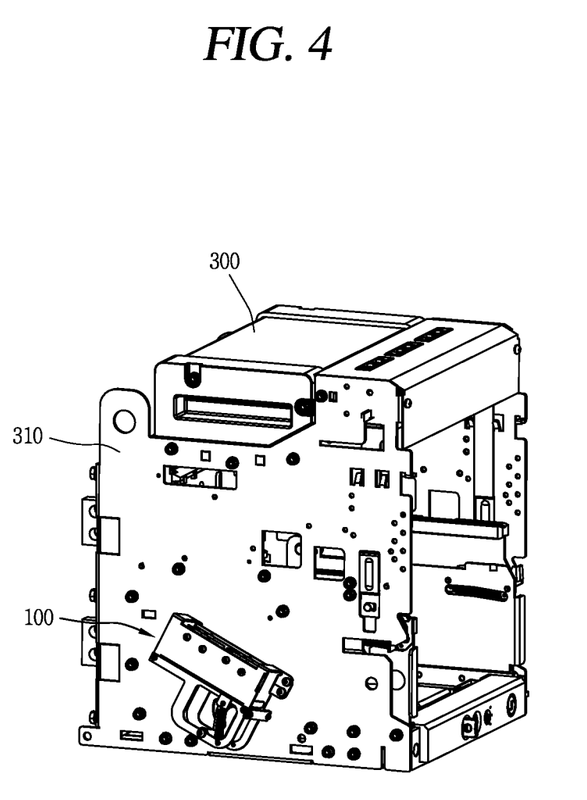
FIG. 4 is a perspective view illustrating a state where a position display device according to an embodiment of the present invention is connected to a draw in and out type circuit breaker.
Figure 5:
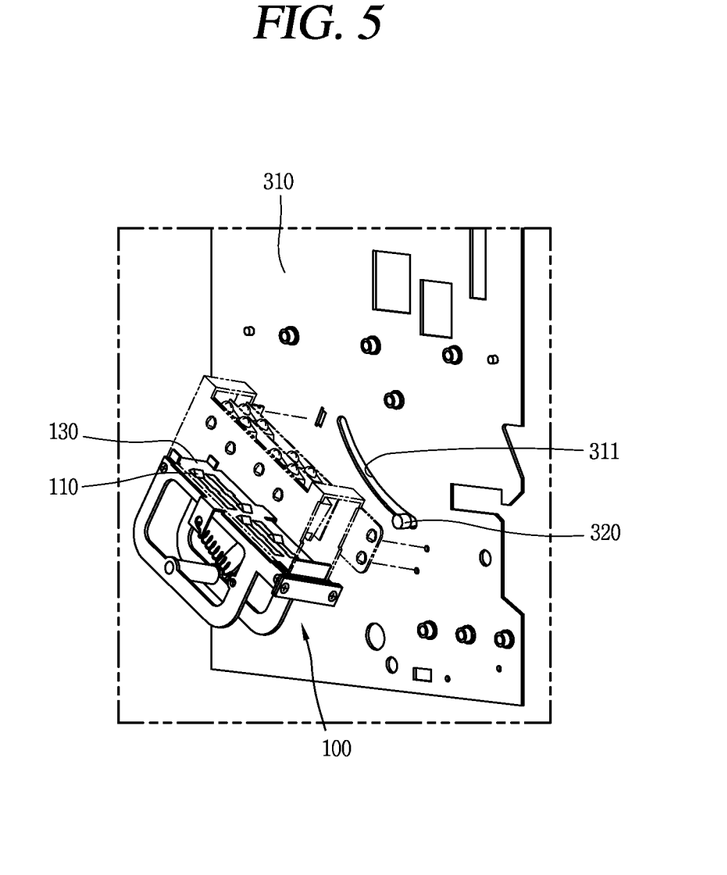
FIG. 5 is a perspective view illustrating a state where a slide plate and a clip are provided in a position display device according to an embodiment of the present invention.
Figure 6:
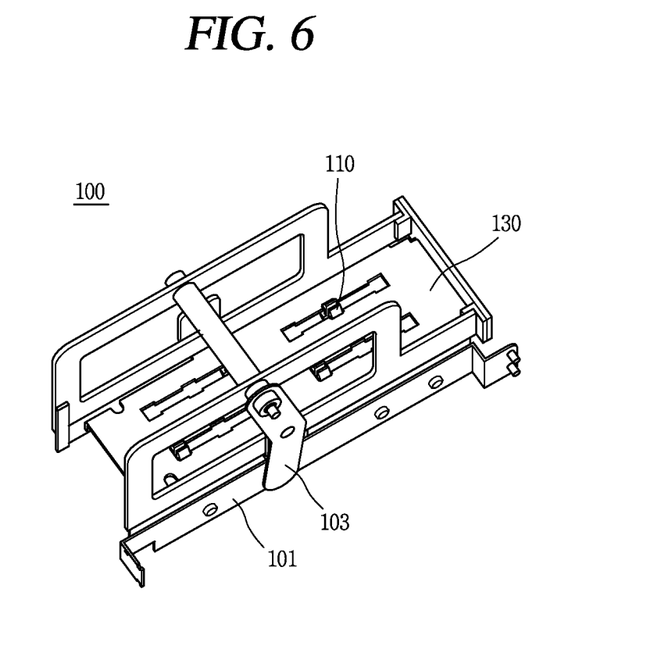
FIG. 6 is a perspective view illustrating a position display device according to an embodiment of the present invention.
Figure 7:
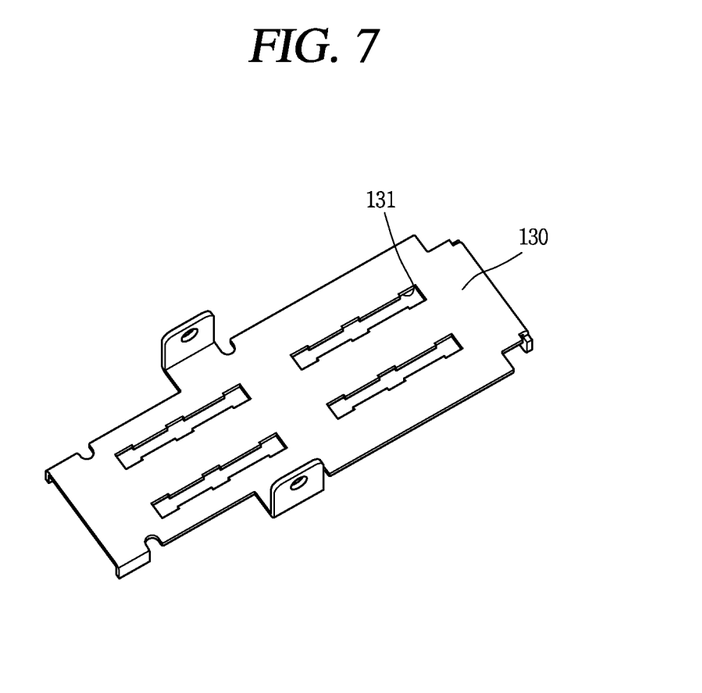
FIG. 7 is a perspective view illustrating a slide plate according to an embodiment of the present invention.
Figure 8:
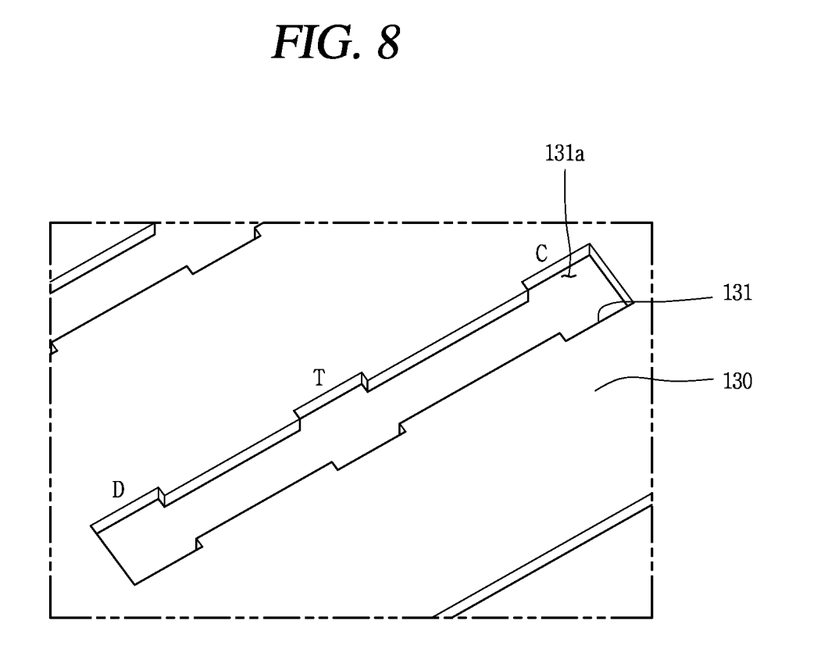
FIG. 8 is a perspective view illustrating a guide slot included in a slide plate according to an embodiment of the present invention.
Figure 9:
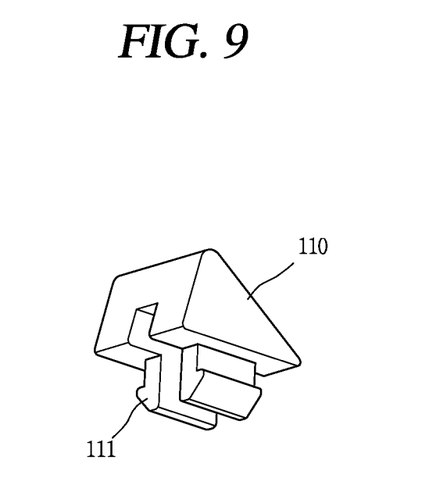
FIG. 9 is a perspective view illustrating a clip included in a position display device according to an embodiment of the present invention.

FIG. 4 is a perspective view illustrating a state where a position display device according to an embodiment of the present invention is connected to a draw in and out type circuit breaker. FIG. 5 is a perspective view illustrating a state where a slide plate and a clip are provided in a position display device according to an embodiment of the present invention. FIG. 6 is a perspective view illustrating a position display device according to an embodiment of the present invention. FIG. 7 is a perspective view illustrating a slide plate according to an embodiment of the present invention. FIG. 8 is a perspective view illustrating a guide slot included in a slide plate according to an embodiment of the present invention. FIG. 9 is a perspective view illustrating a clip included in a position display device according to an embodiment of the present invention.

Figure 10:
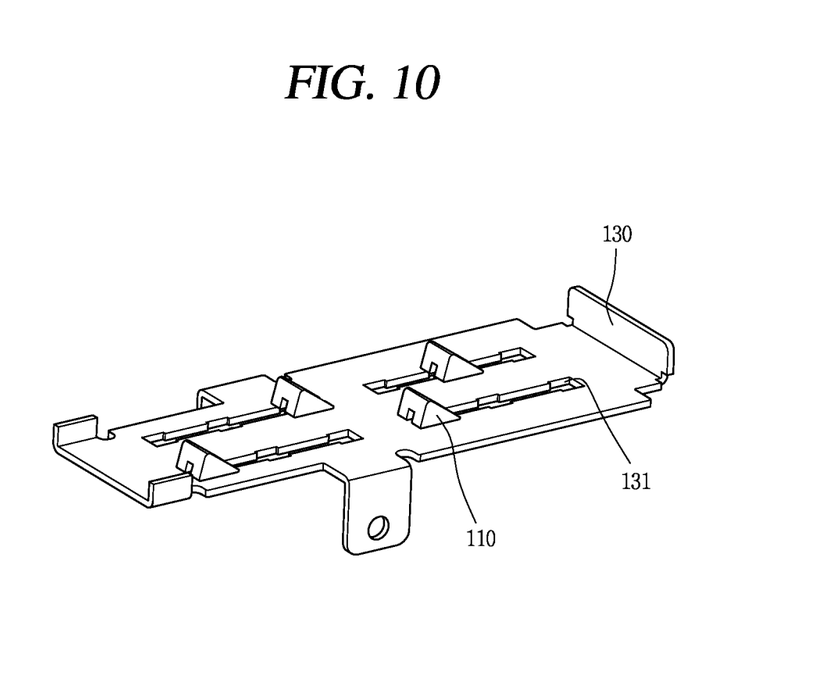
FIG. 10 is a perspective view illustrating a state where a clip is fitted into a slide plate of a position display device according to an embodiment of the present invention.
Figure 11:
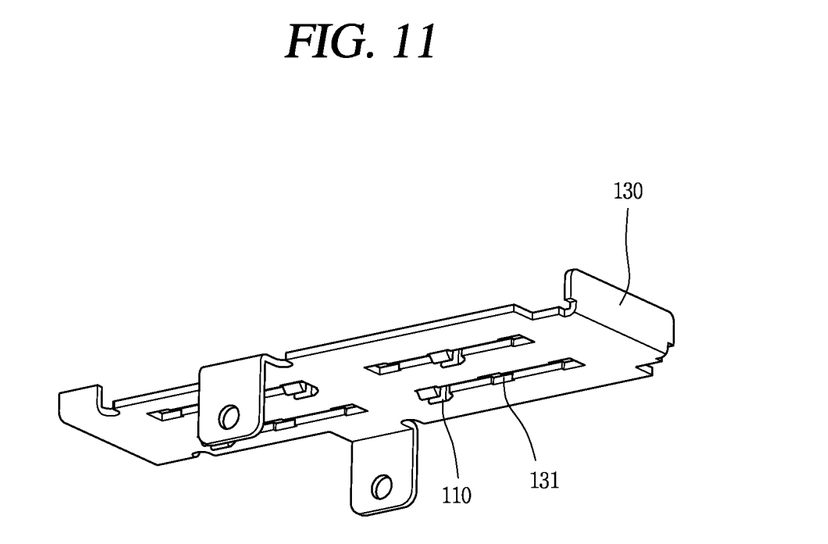
FIG. 11 is another perspective view illustrating a state where a clip is fitted into a slide plate of a position display device according to an embodiment of the present invention.
Figure 12:
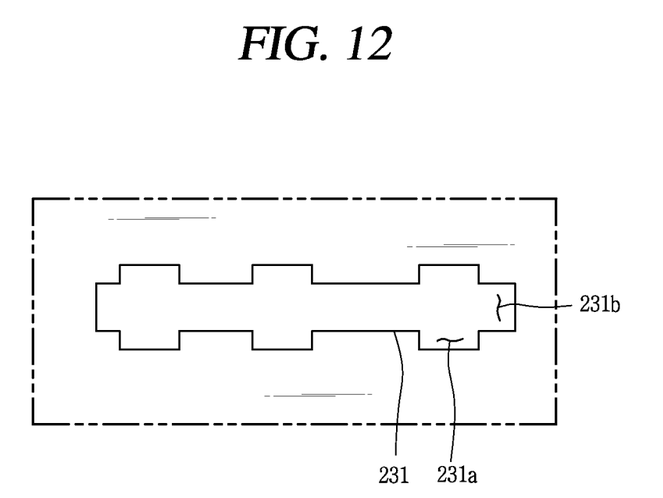
FIG. 12 is a plan view illustrating a guide slot provided in a slide plate of a position display device according to an embodiment of the present invention.
Figure 13:
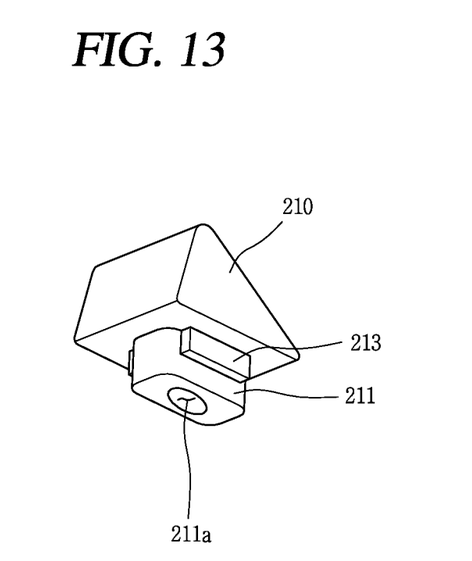
FIG. 13 is a perspective view illustrating another clip fitted into a slide plate of a position display device according to an embodiment of the present invention.
Figure 14:
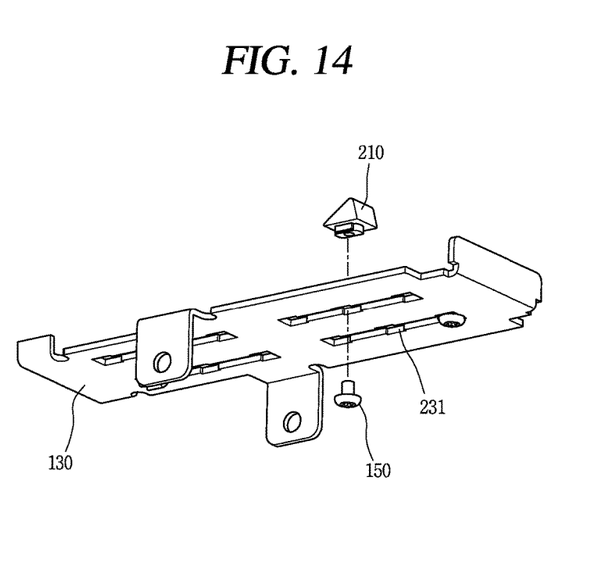
FIG. 14 is a perspective view illustrating a state where another clip is fitted into through a fastening member a slide plate of a position display device according to an embodiment of the present invention.

Moreover, FIG. 10 is a perspective view illustrating a state where a clip is fitted into a slide plate of a position display device according to an embodiment of the present invention. FIG. 11 is another perspective view illustrating a state where a clip is fitted into a slide plate of a position display device according to an embodiment of the present invention. FIG. 12 is a plan view illustrating a guide slot provided in a slide plate of a position display device according to an embodiment of the present invention. FIG. 13 is a perspective view illustrating another clip fitted into a slide plate of a position display device according to an embodiment of the present invention. FIG. 14 is a perspective view illustrating a state where another clip is fitted into through a fastening member a slide plate of a position display device according to an embodiment of the present invention.

As illustrated in FIGS. 4 to 6, the draw in and out type circuit breaker according to an embodiment of the present invention may include a circuit breaker body (not shown), a cradle 300 which moves with the circuit breaker body being accommodated into the cradle 300, and a position display device 100 which is connected to the cradle 300 to display a position of the circuit breaker body.

In this case, the position display device 100 may be provided on a side wall 310 of the cradle 300, and when the circuit breaker body (not shown) is accommodated into the cradle 300 and moves to a test position, a disconnected position, or a connected position, the position of the circuit breaker body may be externally displayed.

The position display device 10 may include a case 101, a lever 103 which is coupled to the case 101 and rotates according to a movement of the circuit breaker body, a slide plate 130 which moves in a horizontal direction according to a rotation of the lever 103, and a clip 110 which is fitted into the slide plate 130.

When the circuit breaker body moves to the test position, the disconnected position, or the connected position, the slide plate 130 may move. In this case, when the circuit breaker body is accommodated into the cradle 300 and moves, a draw gear (not shown) included in the cradle 300 may rotate, and a control pin 320 included in the draw gear may apply a force to the lever 103 while moving along a side wall hole 311 included in a side wall 310 of the cradle 300.

At this time, when the lever 103 rotates through the control pin 320, the slide plate 130 may move in the horizontal direction according to a rotation of the lever 103 to control a position indication switch (not shown), thereby externally displaying the position of the circuit breaker body.

Moreover, the clip 110 may be provided in plurality, and the plurality of clips 110 may be fitted into the slide plate 130. The clips 110 may push a roller (not shown) disposed over the slide plate 130 according to a movement of the slide plate 130 and may move the position indication switch through the roller, thereby displaying the position of the circuit breaker body.

As illustrated in FIGS. 7 and 8, at least one guide slot 131 may be included in the slide plate 130 in order for the clips 110 to move.

The guide slot 131 may be provided as one or more along a lengthwise direction of the slide plate 130. The guide slot 131 may guide the clip 110 in order for the clip 110 to move to the test position, the disconnected position, or the connected position with the clip 110 being fitted into the guide slot 131.

In the related art, the clip 110 should be separated from the slide plate 130, for moving the clip 110. According to an embodiment of the present invention, when the clip 110 is pushed in the lengthwise direction of the slide plate 130 with being fitted into the guide slot 131, the clip 110 may move to a desired position, and thus, a position of the clip 110 is easily controlled.

As illustrated in FIG. 9, a fixing part 111 may be provided under the clip 110 so that the clip 110 is fitted into and fixed to the guide slot 131. The fixing part 111 may be provided in a hook shape.

Therefore, when the clip 110 is fitted into the guide slot 131, the fixing part 111 may be fitted into the guide slot 131 and may be closely adhered to both ends of the guide slot 131, and thus, the clip 110 may be mounted on and fixed to the guide slot 131.

The fixing part 111 may be provided in various shapes in addition to a hook shape, in order not to be separated from the slide plate 130.

For example, a plate-shaped hanging plate (not shown) may be provided on a bottom of the fixing part 111 and may be parallel to the slide plate 130. The hanging plate 130 may be hung on the bottom of the slide plate 130. Accordingly, the hanging plate 130 may have a structure which is simpler than a hook shape, thereby effectively preventing the clip 110 from being separated from the guide slot 131.

In addition, as illustrated in FIG. 8, a plurality of fixing grooves 131a may be provided in the guide slot 131 so that the fixing part 111 is fitted into the guide slot 131 and moves to the test position, the disconnected position, or the connected position of the circuit breaker body, and thus, the position of the circuit breaker body is externally displayed.

That is, the fixing grooves 131a may be disposed in a center portion of the guide slot 131 so as to indicate the test position, and may be disposed in both ends of the guide slot 131 so as to indicate the disconnected position or the connected position.

Therefore, as illustrated in FIGS. 10 and 11, in a case where the clip 110 moves through the guide slot 131 and is fixed to the fixing groove 131a provided at the test position disposed in the center portion of the guide slot 131, when the circuit breaker body moves to the test position, the clip 110 may push the roller while moving according to a movement of the slide plate 130, and thus, the position indication switch may indicate the test position.

Moreover, in a case where the clip 110 moves through the guide slot 131 and is fixed to the fixing groove 131a provided at the disconnected position or the connected position disposed in each of the both ends of the guide slot 131, when the circuit breaker body moves to the disconnected position or the connected position, the clip 110 may push the roller while moving according to a movement of the slide plate 130, and thus, the position indication switch may indicate the disconnected position or the connected position.

As illustrated in FIGS. 12 to 14, a movement guide part 211 that is fitted into a guide slot 231 to guide a movement of a clip 210 may be provided under the clip 210. Also, a fixing bar 213 which is fitted into a fixing groove 231a may be provided in each of both sides of movement guide part 211 so as to indicate a movement of the clip 210 to the test position, the disconnected position, or the connected position of the circuit breaker body.

Moreover, the fixing groove 231a into which the fixing bar 213 is fitted may be provided in the guide slot 231 so as to indicate a movement of the clip 210 to the test position, the disconnected position, or the connected position of the circuit breaker body.

Therefore, when the clip 210 is fitted into the test position, the disconnected position, or the connected position of the slide plate 130, the fixing bar 213 may be fitted into the fixing groove 231a and may limit a movement of the clip 210.

At this time, in a case of desiring to move the clip 210 to another position, when the clip 210 is pulled to an upper side to a certain degree, the fixing bar 213 may be separated from the fixing groove 231a, and the movement guide part 211 may be located with a certain portion of a lower portion of the movement guide part 211 being fitted into the guide slot 231, whereby the clip 210 may move through the guide slot 231.

Moreover, when the clip 210 moves along the guide slot 231 and then the fixing bar 213 is located at one of the test position, the disconnected position, or the connected position and is pushed into a lower side, the fixing bar 213 may be fitted into the fixing groove 231a, and thus, a movement of the fixing bar 213 may be limited, whereby the clip 210 may be fixed to a desired position among the test position, the disconnected position, or the connected position of the slide plate 130.

A fastening hole 221a may be further provided in a bottom of the movement guide part 211. The clip 210 may be fixed to the slide plate 130 by a fastening member 150 such as a bolt passing through the fastening hole 211a.

That is, when the fastening member 150 such as a bolt passes through the fastening hole 211a with the clip 210 being fitted into the guide slot 231, the clip 210 may be closely fixed to the slide plate 130 by the fastening member 150 in a state of contacting the slide plate 130.

In addition, an accommodating groove 231b into which one end or the other end of the movement guide part 211 is accommodated may be further provided in each of a front end and a rear end of the guide slot 231.

When the clip 210 moves to the disconnected position or the connected position and is fixed, the one end or the other end of the movement guide part 211 which is located to further protrude to both sides than the fixing bar 213 may be accommodated into the accommodating groove 231b, and thus, the clip 210 may be fitted into and fixed to the disconnected position or the connected position of the slide plate 130.

As described above, according to the embodiments of the present invention, the one or more guide slots 131 and 231 may be provided in the slide plate 130 of the position display device 100 included in the draw in and out type circuit breaker, and the plurality of clips 110 and 120 may respectively move to the test positions, the disconnected positions, or the connected positions of the guide slots 131 and 231 with being respectively fitted into the guide slots 131 and 231, thereby enabling a position of the clip 210 to be easily controlled.

Moreover, since the clips 110 and 210 move with being respectively fitted into the guide slots 131 and 231, it is not required to separate the clips 110 and 210 from the guide slots 131 and 231 for controlling a position, and thus, a risk of losing the clips 110 and 210 in controlling a position is prevented.

Moreover, since the fixing part 111 having a hook shape is provided under the clip 110, the clip 110 is solidly fixed to the test position, the disconnected position, or the connected position of the guide slot 131, and thus, is not easily separated from the guide slot 131.

Moreover, since the fixing bar 213 fitted into the fixing groove 231a of the guide slot 231 is provided under the clip 210 and the movement guide part 211 that guides a movement of the clip 210 is provided, the clip 210 may be fitted into the fixing groove 231a through the fixing bar 213 while moving the guide slot 231, and thus, a movement of the clip 210 is limited. Accordingly, the clip 210 is fixed to the test position, the disconnected position, or the connected position of the guide slot 231 without being separated from the guide slot 231.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A draw in and out type circuit breaker including a circuit breaker body, a cradle which moves with the circuit breaker body being accommodated into the cradle, and a position display device connected to the cradle to display a position of the circuit breaker body, the position display device comprising:
   a case;
   a lever provided on one side of the case to rotate according to a rotation of the circuit breaker body;
   a slide plate provided in the case to move according to a rotation of the lever, the slide plate including at least one guide slot; and
   a clip fitted into the at least one guide slot, wherein the clip is configured to move to a position corresponding to a test position, a connected position or a disconnected position of the circuit breaker body so that the position of the circuit breaker body is displayed according to a movement of the slide plate,
   wherein a fixing part is provided under the clip so that the clip is fitted into and fixed to the at least one guide slot.

2. The draw in and out type circuit breaker of claim 1, wherein the fixing part has a hook shape.

3. The draw in and out type circuit breaker of claim 1, wherein a fixing groove is provided in the at least one guide slot, and the fixing part is fitted into and fixed to the fixing groove according to a movement to the test position, the connected position, or the disconnected position of the circuit breaker body.

4. The draw in and out type circuit breaker of claim 1, wherein:
   a fixing groove is fitted is provided in the at least one guide slot according to a movement to the test position, the connected position, or the disconnected position of the circuit breaker body,
   a movement guide part which is fitted into the at least one guide slot to guide the movement of the clip is provided under the clip, and a fixing bar is provided on each of both sides of the movement guide part and is fitted into the fixing groove according to a movement to the test position, the connected position, or the disconnected position of the circuit breaker body.

5. The draw in and out type circuit breaker of claim 4, wherein
a fastening hole is provided in a bottom of the movement guide part, and
a fastening member passes through the fastening hole with the clip being fitted into the at least one guide slot, and the clip is fixed to the slide plate.

6. The draw in and out type circuit breaker of claim 5, wherein an accommodating groove is provided in each of a front end and a rear end of the at least one guide slot, and when the clip moves, one end or the other end of the movement guide part is accommodated into the accommodating groove.

* * * * *